US006389453B1

United States Patent
Willis

(10) Patent No.: US 6,389,453 B1
(45) Date of Patent: May 14, 2002

(54) METHOD AND SYSTEM FOR ROUTING UNDIRECTIONAL MULTICAST DATA

(75) Inventor: Edward Dean Willis, Plano, TX (US)

(73) Assignee: MCI Communications Corporation, Washington, DC (US)

(*) Notice: Subject to any disclaimer, the term of this patent is extended or adjusted under 35 U.S.C. 154(b) by 0 days.

(21) Appl. No.: 08/948,348

(22) Filed: Oct. 9, 1997

(51) Int. Cl.[7] ............................................... H04L 15/26
(52) U.S. Cl. ...................... 709/204; 709/227; 370/401
(58) Field of Search ................................. 370/401, 432, 370/469, 202, 908; 455/8, 69, 503, 3.1; 709/239, 204, 227

(56) References Cited

U.S. PATENT DOCUMENTS

| | | | | |
|---|---|---|---|---|
| 5,103,444 A | * | 4/1992 | Leung et al. ................ | 370/342 |
| 5,115,495 A | * | 5/1992 | Tsuchiya et al. ............. | 709/239 |
| 5,195,086 A | * | 3/1993 | Baumgartner ................ | 370/264 |
| 5,457,808 A | * | 10/1995 | Osawa et al. ................. | 455/8 |
| 5,469,438 A | * | 11/1995 | Baumert ....................... | 370/432 |
| 5,606,551 A | * | 2/1997 | Kartapoulos ................. | 370/406 |
| 5,684,800 A | * | 11/1997 | Dobbins et al. .............. | 370/401 |
| 5,752,003 A | * | 5/1998 | Hart ............................. | 395/500 |
| 5,790,546 A | * | 8/1998 | Dobbins ....................... | 370/400 |
| 5,835,710 A | * | 11/1998 | Nagami et al. ............... | 709/250 |
| 5,905,865 A | * | 5/1999 | Palmer ......................... | 455/3.1 |

* cited by examiner

Primary Examiner—Ayaz Sheikh
Assistant Examiner—Khanh Quang Dinh

(57) ABSTRACT

A method of and system for transmitting multicast packets unidirectionally from a transmitter of a source network to a receiver of a client network and unicast packets bidirectionally between the source network and the client network by configuring a selected router of the client network to accept multicast packets from the receiver, establishing a virtual connection between the selected router of the client network and a selected router of the source network, and advertising in the client network that the virtual connection is the shortest path from the client network to the source network.

12 Claims, 2 Drawing Sheets

METHOD AND SYSTEM FOR ROUTING UNDIRECTIONAL MULTICAST DATA

FIELD OF THE INVENTION

The present invention relates generally to data communications, and more particularly to a system that provides for the unidirectional transmission of multicast data packets from a first network to a second network as well as bidirectional transmission of unicast data packets between the first and second networks.

DESCRIPTION OF THE PRIOR ART

In its simplest form, a network comprises two or more nodes that are interconnected such that data can be communicated from one node of the network to any other node of the network. Networks can be connected to other networks by means of routers so that data can be passed from a node of a first network to one or more nodes of a second network. A network can also comprise a plurality of subnetworks interconnected by routers to make a larger network.

In network protocols, such as TCP/IP, data is transmitted through the network in packets. An internet protocol (IP) packet comprises a header which contains, among other things, a destination address and a source address, and a data segment attached to the header. There are at least three types of IP packets. A first type is a unicast packet in which the packet is addressed from a single source address to a single destination destination. Another type of IP packet is a multicast packet that is addressed from a single source address to a group address that consists of a defined plurality of destination addresses. Finally, a third type of packet is a broadcast packet that is broadcast from a single source address to every destination in the network.

Routers receive packets and forward the packets according to their source and destination addresses and the topology of the network. It is important that the same packet be delivered to its destination only once and that loops not be created in a network. A loop occurs when there are multiple paths between routers in a network and the same packet is sent back and forth between two or more routers in an endless fashion. Loops are prevented by the use of reverse path forwarding checks. Each router knows the appropriate direction of travel of a packet from a particular source to a particular destination through the network. If a router receives a packet coming from the wrong direction, the router drops the packet without forwarding it.

The interface between two separate networks is through boundary routers. All packets transmitted between the two networks go through the boundary routers. Thus, all packets addressed from a node in the first network to a node in the second network are routed to a boundary router of the first network. Similarly, all packets addressed from a node in the second network to a node in the first network are routed within the second network to a boundary router of the second network. Occasionally, it is desirable or necessary to have multiple communication links between two networks. For example, it may be necessary or desirable to transmit high bandwidth data, such as full motion video, from a first network to a second network, as well as normal internet data back and forth between the two networks. In such cases, the video data is typically transmitted over a unidirectional high bandwidth link such as a satellite link between the two networks. The normal internet traffic is transported over conventional internet links.

A problem associated with transmitting data between the same two networks over separate links is that the separate links typically enter the network through separate boundary routers. Thus, multicast packets from a source in the first network to a destination in the second network can travel through the second network in a direction opposite the direction unicast packets. A multicast packet traveling in what appears to be the wrong direction through the network will be eliminated by the reverse path forwarding checks performed by the routers. Thus, packets that enter the network through one of the boundary routers may not be able to be forwarded to all nodes of the network.

SUMMARY OF THE INVENTION

The present invention provides a method of and system for transmitting multicast packets unidirectionally from a transmitter of a source network to a receiver of a client network and unicast packets bidirectionally between the source network and the client network. In one of its aspects, the method of the present invention includes the steps of configuring a selected router of the client network to accept multicast packets from the receiver, establishing a virtual connection between the selected router of the client network and a selected router of the source network, and advertising in the client network that the virtual connection is the shortest path from the client network to the source network.

According to the present invention, multicast packets are forwarded from a source in the source network to a selected router of the source network. The selected router of the source network forwards the multicast packets to a selected router of the client network over a unidirectional link. The selected router of the client network forwards the multicast packets to the client network.

The client network forwards to the selected router of the client network all unicast packets addressed from a client of the client network to a source of the source network. The selected router of the client network encapsulates the unicast packets addressed from the client network to the source network and forwards the encapsulated unicast packets to the source network over a bidirectional link connecting the source and client networks. The selected router of the source network receives and decapsulates the encapsulated unicast packets. Then, the selected router of the source network forwards the decapsulated unicast packets to said source network.

Similarly, the source network forwards to the selected router of the source network all unicast packets addressed from a source of the source network to a client of the client network. The selected router encapsulates the unicast packets received from the source network and forwards those encapsulated unicast packets to the client network over the bidirectional link. The selected router of the client network receives and decapsulates the encapsulated unicast packets received over the bidirectional link. The selected router of the client network forwards decapsulated unicast packets to the client network.

DESCRIPTION OF THE PREFERRED EMBODIMENT

Figure 1:
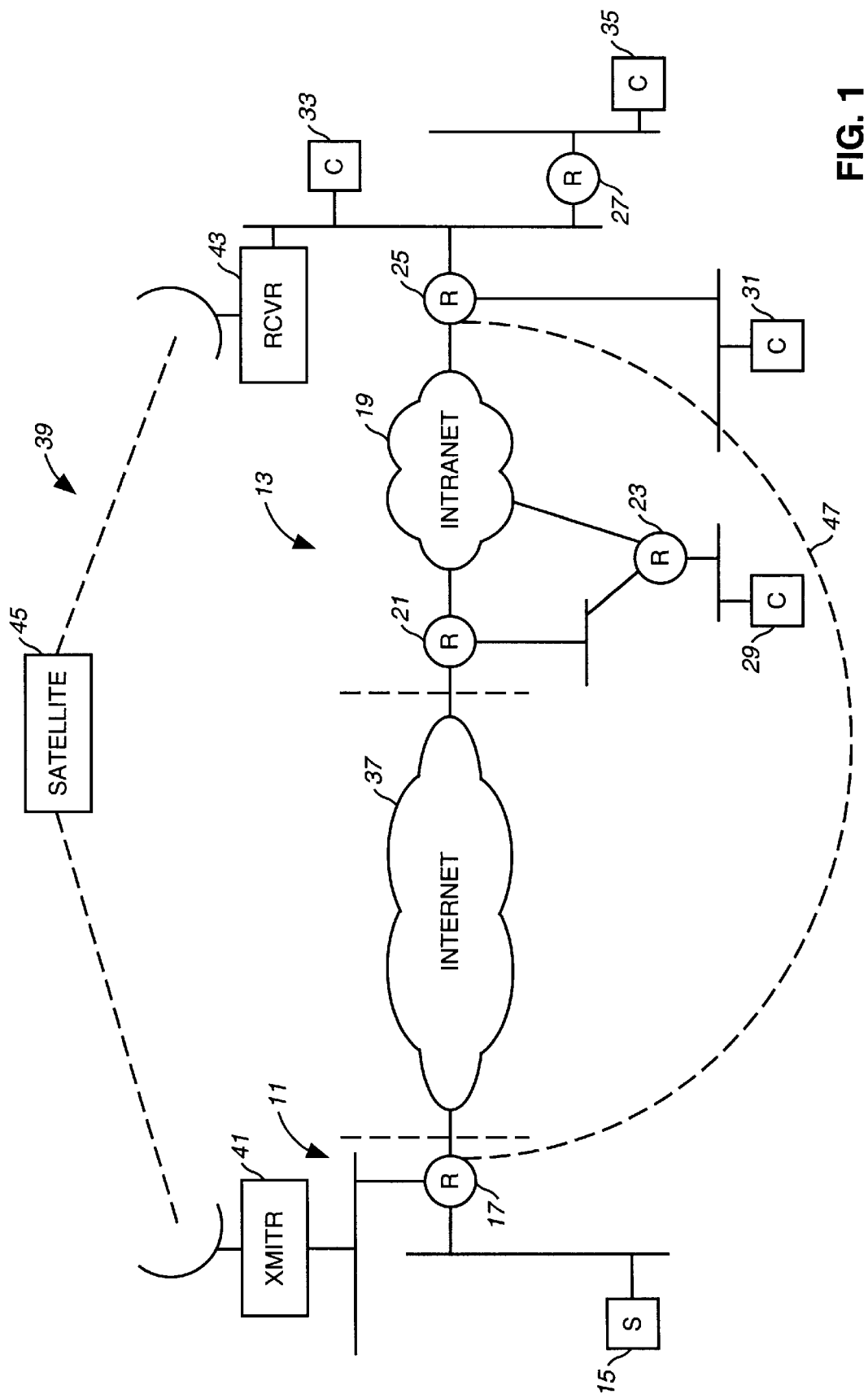
FIG. 1 is a block diagram of a system according to the present invention.

Referring now to the drawings, and first to FIG. 1, a source network is designated generally by the numeral 11 and a client network is designated generally by the numeral 13. Source network 11 includes a source node 15 and a router 17. Client network is relatively complex and it comprises an intranet 19, which includes routers 21–27 and client nodes 29–35.

Networks 11 and 13 are interconnected by the internet 37 and a satellite link, designated generally by the numeral 39. Satellite link 39 includes an uplink transmitter 41, which is part of source network 11, and downlink receiver 43, which is part of client network 13, and a satellite 45. Satellite link 39 provides a high bandwidth unidirectional transmission path for multicast packets between network 11 and network 13.

The internet 37 provides a relatively low bandwidth bidirectional transmission path, preferably for unicast packets, between source network 11 and client network 13.

Router 17 is configured to route multicast packets to uplink transmitter 41, and as will be explained in detail hereinafter, to encapsulate and route unicast packets from source network 11 to client network 13 via the internet 37.

As is well known to those skilled in the art, the internet 37 comprises a large number of interconnected routers. Thus, there are multiple paths through internet 37 between router 17 of source network 11 and router 21 of client network 13. However, unicast all internet traffic between source network 11 and client network 13 is routed through routers 17 and 21. Thus, with respect to traffic through internet 37, routers 17 and 21 are physical boundary routers for networks 11 and 13 respectively. All unicast packets addressed from a node of network 11 to a node of network 13 are physically received at router 21 of network 13.

For purposes of illustrating the problem solved by the present invention and ignoring the encapsulation feature of the present invention, a unicast packet addressed from source node 15 of network 11 to client node 35 of network 13 would be received at router 21. Router 21 would forward the packet through internet 19 to router 25. Router 25 in turn would forward the packet to router 27, which would in turn forward the packet to node 35.

Routers 21–27 expect to see any multicast packet addressed from a node of network 11 to arrive according to the unicast routing topology, which in the example of FIG. 1 is from the physical direction of internet 37. According to reverse path forwarding procedures, any such packet seen to arrive from any other physical direction will be dropped in order to prevent loops. Multicast packets addressed from source node 15 of network 11 to a group address that includes client nodes 29–35 of network 13 will be transmitted over satellite link 39 to receiver 43. Receiver 43 is physically coupled to router 25 and 27. Packets arriving from receiver 43 at router 27 will be seen by router 27 to be traveling in the proper direction. Accordingly, router 27 will forward multicast packets received at receiver 43 to client node 35. However, for purposes of illustration and ignoring the features of the present invention, multicast packets arriving at router 25 from receiver 43 will be seen as traveling in the wrong physical direction. Thus, those multicast packets will fail the reverse path forwarding check at router 25 and will not be forwarded to client nodes 29 and 31.

The present invention solves the problem illustrated by the foregoing examples by making router 25 the virtual boundary router of client network 13 for both unicast packets received via the internet 37 and multicast packets received via satellite link 39. Router 25 is made the virtual boundary router by establishing a virtual connection or tunnel 47, such as a general route encapsulation tunnel, between router 25 and router 17 of source network 11, advertising to client network 13 that tunnel 47 is the shortest path from client network 13 to source network 17, and by configuring router 25, preferably with a static MROUTE entry, to accept multicast packets from receiver 43.

Figure 2:
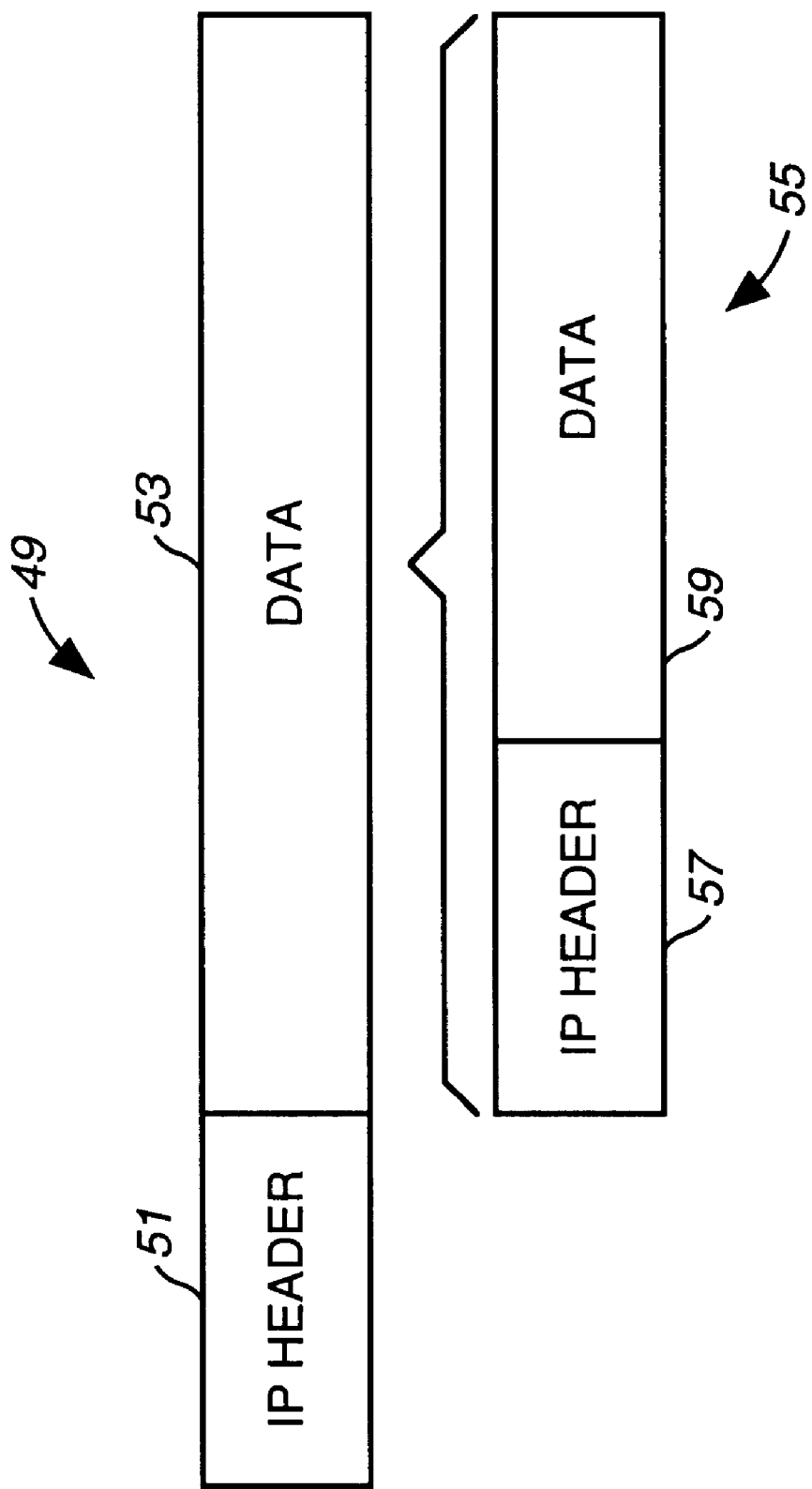
FIG. 2 is block diagram illustrating an encapsulated packet according to the present invention.

Tunnel 47 is established by encapsulating all unicast packets transported between source network 11 and client network 13 over internet 37. Referring to FIG. 2, an encapsulated packet is designated by the numeral 49. Encapsulated packet 49 includes a header 51 and a data portion 53. Data portion 53 comprises a packet designated generally by the numeral 55. Packet 55 includes a header 57 and a data portion 59. Packet 55 is a standard unicast packet the header of which includes origination and destination node addresses in networks 11 and 13. Header 51 of encapsulated packet 49 includes the addresses of routers 17 and 25.

Referring again to FIG. 1, according to the present invention, router 17 encapsulates unicast packets addressed from source node 15 to a client node 29–35 of client network 13 in an encapsulated packet addressed from router 17 to router 25. Physically, the encapsulated packet is transported from router 17 to router 25 by way of the internet 37, router 21, and intranet 19. However, logically, the encapsulated packet is transported through the virtual connection of tunnel 47. When the encapsulated packet arrives at router 25, router 25 decapsulates the packet by stripping off the encapsulation header and then routes the decapsulated packet to the appropriate client node.

For unicast packets addressed from a client node 29–35 of network 11 to source node 15, by advertising that tunnel 47 is the shortest route between network 13 and network 11, the routers of network 13 forward the unicast packet to router 25. For example, a packet addressed from client node 29 to source node 15 would be routed to router 25 by router 23 through intranet 19 rather than to router 21. When router 25 receives the packet, router 25 encapsulates the packet into an encapsulated packet addressed from router 25 to router 17. Physically, the encapsulated packet is forwarded to router 17 through intranet 19, router 21, and the internet 37. However, logically, the encapsulated packet is forwarded to router 17 of source network 11 through tunnel 47. Router 17 decapsulates the packet and forwards the decapsulated packet to source node 15.

Router 25 is configured to accept multicast packets from down link receiver 43. Thus, when a multicast packet arrives at router 25 from receiver 43, router 25 forwards the packet appropriately. For example, router 25 would forward a multicast packet having a group destination address that includes client node 29 through intranet 19 to router 23.

From the foregoing, it may seen that by making router 25 the virtual boundary router of client network 13 for both multicast and unicast packets, packets can be routed to all nodes of the network without violating reverse path forwarding checks. All packets addressed to a node of client network 13 appear to enter network 13 at router 25. Similarly, all packets addressed from a node of client network 13 to a node of source network 11 are forwarded to router 25. Thus, the present invention overcomes the shortcomings of the prior art.

What is claimed is:

1. A method of transmitting multicast packets unidirectionally from a transmitter of a source network to a receiver of a client network and unicast packets bidirectionally between said source network and said client network, which comprises the steps of:

configuring a selected router of said client network to accept multicast packets from said receiver so as to prevent a reverse path forwarding check failure;

establishing a virtual connection between said selected router of said client network and a selected router of said source network; and, advertising in said client network that said virtual connection is the shortest path from said client network to said source network.

2. The method as claimed in claim 1, including the step of transmitting unicast packets between said source network and said client network over said virtual connection.

3. The method as claimed in claim 1, wherein said step of establishing a virtual connection includes the step of encapsulating unicast packets transmitted between said source network and said client network.

4. The method as claimed in claim 1, including the step of transmitting said multicast packets from said transmitter of said source network to said receiver of said client network over a satellite link.

5. A method of transmitting multicast packets unidirectionally from a source network to a client network and unicast packets bidirectionally between said source network and said client network, which comprises the steps of:

forwarding multicast packets from a source in said source network to a selected router, configured to prevent a reverse path forwarding check failure, of said source network;

forwarding said multicast packets from said selected router of said source network to a selected router of said client network over a unidirectional link;

forwarding said multicast packets from said selected router of said client network to said client network;

forwarding to said selected router of said client network all unicast packets addressed from a client of said client network to a source of said source network;

encapsulating said unicast packets addressed from said client network to said source network at said selected router of said client network; and, forwarding said encapsulated unicast packets from said selected router of said client network to said source network.

6. The method as claimed in claim 5, including the steps of:

receiving said encapsulated unicast packets at said selected router of said source network;

decapsulating said encapsulated unicast packets received at said selected router of said source network; and, forwarding said decapsulated unicast packets from said selected router of said source network to said source network.

7. The method as claimed in claim 5, including the steps of:

forwarding to said selected router of said source network all unicast packets addressed from a source of said source network to a client of said client network;

encapsulating said unicast packets addressed from a source of said source network to a client of said client network at said selected router of said source network; and, forwarding said encapsulated unicast packets from said selected router of said source network to said client network.

8. The method as claimed in claim 7, including the steps of:

receiving said encapsulated unicast packets at said selected router of said client network;

decapsulating said encapsulated unicast packets received at said selected router of said client network; and, forwarding said decapsulated unicast packets from said selected router of said client network to said client network.

9. A network system, which comprises:

a source network, said source network including at least one source and at least one router;

a client network, said client network including a plurality of clients and a plurality of routers;

a unidirectional link between said source network and said client network;

at least one bidirectional link between said source network and said client network;

wherein said at least one router of said source network is configured:

to forward multicast packets from a source of said source network to said client network over said unidirectional link and prevent a reverse path forwarding check failure; and, to decapsulate any packets received over said bidirectional link;

and wherein a selected router of said client network is configured:

to receive any multicast packets forwarded over said unidirectional link;

to encapsulate all unicast packets addressed from a client of said client network to a source of said source network; and forward said encapsulated packets to said source network over said bidirectional link.

10. The network system as claimed in claim 9, wherein said at least one router of said source network is further configured to:

encapsulate all unicast packets addressed from a source of said source network to a client of said client network; and, forward all packets encapsulated by said at least one router over said bidirectional link.

11. The network system as claimed in claim 10, wherein said selected router of said client network is further configured to:

decapsulate all encapsulated packets received over said bidirectional link.

12. The network system as claimed in claim 9, wherein said unidirectional link includes:

a satellite transmitter adapted to receive multicast packets from said at least one router of said source network;

a satellite transmitter adapted to forward multicast packets to said selected router of said client network; and, a satellite adapted to receive multicast packets from said satellite transmitter and transmit said multicast packets to said satellite receiver.

* * * * *